(12) United States Patent
Frenkiel et al.

(10) Patent No.: US 8,856,766 B2
(45) Date of Patent: Oct. 7, 2014

(54) GENERATING LAYOUTS FOR GRAPHS OF DATA FLOW APPLICATIONS

(75) Inventors: Andrew Lawrence Frenkiel, Irvington, NY (US); Henrique Andrade, Croton on Hudson, NY (US); Bugra Gedik, White Plains, NY (US); Michael Donald Pfeifer, Rochester, MN (US); Wim De Pauw, Scarborough, NY (US)

(73) Assignee: International Business Machines Corporation, Armonk, NY (US)

(*) Notice: Subject to any disclaimer, the term of this patent is extended or adjusted under 35 U.S.C. 154(b) by 132 days.

(21) Appl. No.: 13/469,409

(22) Filed: May 11, 2012

(65) Prior Publication Data

US 2014/0033173 A1   Jan. 30, 2014

(51) Int. Cl.
G06F 9/44       (2006.01)
G06F 9/45       (2006.01)

(52) U.S. Cl.
CPC ... *G06F 8/00* (2013.01); *G06F 8/74* (2013.01)
USPC ............................. 717/156; 717/109; 717/158

(58) Field of Classification Search
None
See application file for complete search history.

(56) References Cited

U.S. PATENT DOCUMENTS

| | | | |
|---|---|---|---|
| 5,801,958 A | 9/1998 | Dangelo et al. | |
| 6,772,399 B2 | 8/2004 | Saluja et al. | |
| 6,792,595 B1 * | 9/2004 | Storistenau et al. | 717/109 |
| 6,934,935 B1 * | 8/2005 | Bennett et al. | 717/156 |
| 7,174,536 B1 * | 2/2007 | Kothari et al. | 717/156 |
| 7,293,259 B1 * | 11/2007 | Dmitriev | 717/158 |
| 7,293,260 B1 * | 11/2007 | Dmitriev | 717/158 |
| 7,853,930 B2 * | 12/2010 | Mitchell et al. | 717/156 |
| 8,381,178 B2 * | 2/2013 | Martino et al. | 717/109 |
| 8,438,537 B2 * | 5/2013 | Becker et al. | 717/109 |
| 2005/0229153 A1 * | 10/2005 | Banavar et al. | 717/109 |
| 2006/0150168 A1 * | 7/2006 | Mitchell et al. | 717/156 |
| 2010/0083185 A1 | 4/2010 | Sakai | |
| 2010/0205579 A1 * | 8/2010 | Zhao et al. | 717/105 |

(Continued)

FOREIGN PATENT DOCUMENTS

JP        02009169694 A     7/2009

OTHER PUBLICATIONS

Johan Carlsson, "Optimisation of a Graph Visualization Tool: Vizz3D", Apr. 2006, School of Mathematics and Systems Engineering, Växjö University, Sweden, Report 06045, pp. 1-44; <http://www.diva-portal.org/smash/record.jsf?pid=diva2:206812>.*

(Continued)

*Primary Examiner* — Thuy Dao
*Assistant Examiner* — Ben C Wang
(74) *Attorney, Agent, or Firm* — Cahn & Samuels, LLP

(57) ABSTRACT

An embodiment of the invention provides a method of displaying a data flow, wherein a description of a data flow application to be displayed is received. The data flow application includes nodes and edges connecting the nodes, wherein the nodes represent operators and the edges represent data connections for data flowing between the operations. A reason that a user is to view the data flow and/or a user constraint on a complexity of the data flow application to be displayed is determined with a processor; and, the time required to render a display of the data flow application is estimated. A transformed representation of the data flow application is created with the processor. The transformed representation is created based upon the user reason, the user constraint, the estimated time of rendering, and/or a layout strategy. The transformed representation is displayed on a graphical user interface.

20 Claims, 14 Drawing Sheets

(56) References Cited

U.S. PATENT DOCUMENTS

| | | | |
|---|---|---|---|
| 2010/0325621 A1* | 12/2010 | Andrade et al. | 717/156 |
| 2011/0115794 A1 | 5/2011 | Grabarnik et al. | |
| 2011/0249002 A1* | 10/2011 | Duplessis et al. | 345/440 |
| 2012/0278793 A1* | 11/2012 | Jalan et al. | 717/158 |
| 2013/0097592 A1* | 4/2013 | Simitsis et al. | 717/156 |
| 2013/0103719 A1* | 4/2013 | Gotz et al. | 707/798 |
| 2013/0239100 A1* | 9/2013 | Andrade et al. | 717/156 |

OTHER PUBLICATIONS

Collberg et al., "A System for Graph-Based Visualization of the Evolution of Software", 2003 ACM, SoftVis '03, Jun. 11-13, 2003, pp. 77-86; <http://dl.acm.org/citation.cfm?id=774844>.*

McNair et al., "Visualizing Software Architecture Evolution using Change-sets", 2007 IEEE, WCRE'07 Oct. 28-21, 2007, pp. 1-10; <http://ieeexplore.ieee.org/stamp/stamp.jsp?tp=&arnumber=4400159>.*

Golovanevsky et al., "Struct-reorg: current status and future perspectives", Jul. 18-20, 2007, GCC Developers' Summit, Ottawa, Ontario, Canada, IBM, pp. 47-56; <http://researchweb.watson.ibm.com/haifa/dept/svt/papers/golovanevsky.pdf>.*

Böhringer, K., et al., "Using Constraints to Achieve Stability in Automatic Graph Layout Algorithms," Proceedings of ACM SIGCHI Conference on Human Factors in Computing Systems, Apr. 1990.

Braudaway, et al, "Proposal of Research: Constraint Incorporation using Constrained Reformulation," IP.com No. IPCOM000150414D, Apr. 30, 1998.

Coli, et al, "Data Flow Graphs Granularity for Overhead Reduction within a PE in Multiprocessor Systems," International Conference on Application Conference on Application-Specific Array Processors, 1993, Proceedings, pp. 136-139.

Millet, I., "A Proposal to Simplify Data Flow Diagrams," IBM Systems Journal, 1999, vol. 38, no., pp. 118-121.

Spönemann, Miro, "On the Automatic Layout of Data Flow Diagrams," Department of Computer Science Real-Time and Embedded Systems Group, Mar. 19, 2009, Christian-Alberchts-Universität zu Kiel.

http://www.lovettsoftware.com/blogengine.net/category/DGML.aspx, retrieved on Jun. 22, 2010.

IBM InfoSphere Streams Version 2.0.0.3: IBM Streams Processing Language Specification, Copyright IBM Corp. 2009, 2011.

* cited by examiner

GENERATING LAYOUTS FOR GRAPHS OF DATA FLOW APPLICATIONS

This invention was made with Government support under Contract No.: H98230-07-C-0383 awarded by Department of Defense. The Government has certain rights in this invention.

BACKGROUND

The present invention is in the field of methods and computer program products for generating layouts for graphs of data flow applications.

In graph design, a network is comprised of a set of nodes (entities) and edges (lines connecting the nodes representing a relationship between the entities). Algorithms that organize nodes and edges into a graph typically focus on minimizing the number of crossed edges and minimizing the difference in edge lengths. In simple graphs, nodes are either connected to each other or not; in more complex graphs, the strength of the connection is also represented. For example, nodes with stronger connections are typically represented by wider edges.

A typical graph layout can be quite complex, depending upon the nature of the subject of design. This complexity can make it difficult to efficiently analyze the relationships among the nodes rendered therein, including, e.g., identification and representation of clusters.

SUMMARY OF THE INVENTION

An embodiment of the invention provides a method of displaying a data flow, wherein a description of a data flow application to be displayed is received. The data flow application includes nodes and edges connecting the nodes, wherein the nodes represent operators and the edges represent data connections for data flowing between the operations. A reason that a user is to view the data flow and/or a user constraint on a complexity of the data flow application to be displayed is determined with a processor; and, the time required to render a display of the data flow application is estimated.

A transformed representation of the data flow application is created with the processor. The transformed representation is created based upon the user reason, the user constraint, the estimated time of rendering, and/or a layout strategy. The layout strategy includes replacing a first subgraph and at least one second subgraph with a combination subgraph, replacing a third subgraph and at least one fourth subgraph with a logical subgraph, and/or collapsing all composite nodes in a subgraph and expanding the composite nodes until a threshold number of nodes for the subgraph is reached. The combination subgraph includes components from the first subgraph that are in common with the second subgraph, wherein the first subgraph is different from the second subgraph. The logical subgraph includes logical representations of portions in common between the third subgraph and the fourth subgraph, wherein the third subgraph is different from the fourth subgraph. The transformed representation provides a simplification of the complexity of the data flow application. The transformed representation is displayed on a graphical user interface.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Figure 1:
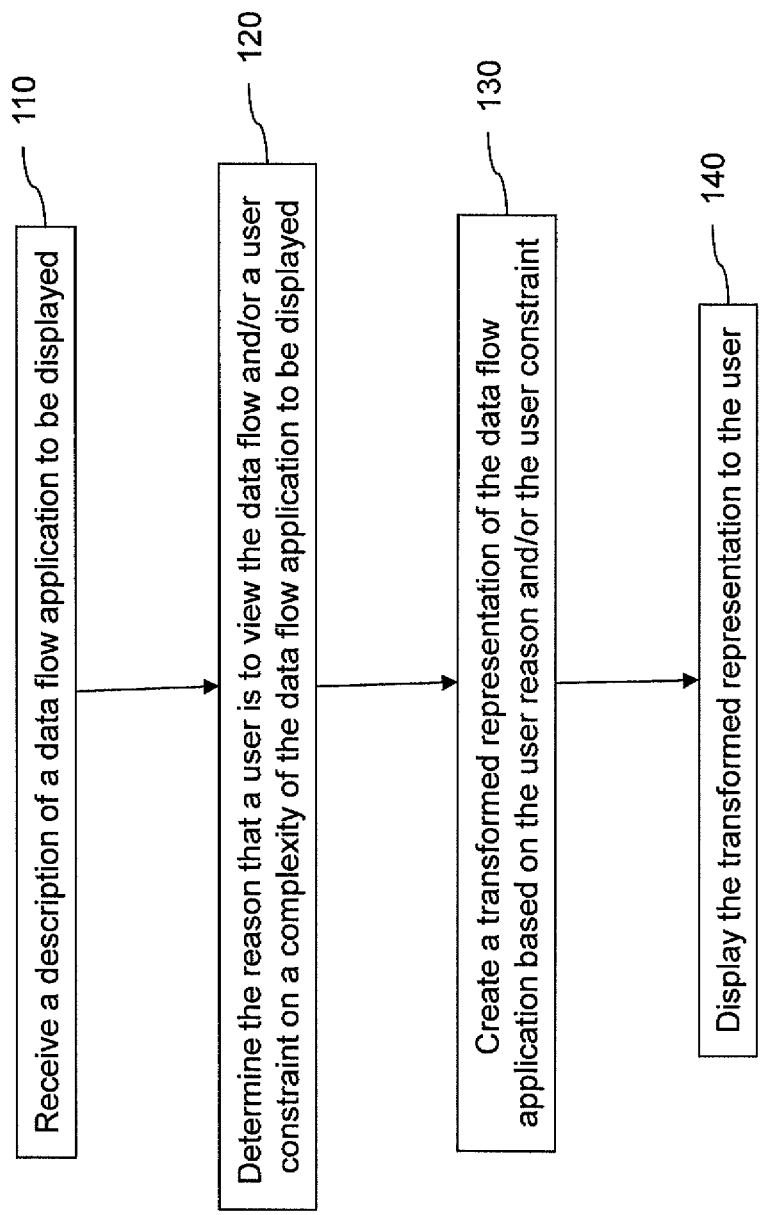
FIG. 1 is a flow diagram illustrating a method of displaying a data flow according to an embodiment of the invention.

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

At least one embodiment of the invention simplifies a representation of a 'stream processing application data flow representation' (or graph) so that it can be more easily understood by a user. Stream processing is a programming paradigm in which operators (e.g., Filter, Split, Join, Source, Sink) are created to perform on the fly operations on a continuous stream of data. Stream operators receive streaming data as input, and produce streaming data as output, passing their output to a next operator in the data flow graph. Thus, a data flow graph is a representation of a software program. The display tool determines why the user is looking at the data flow (e.g., to debug the application, to observe the application in operation) and/or how the user wants to see the graph (e.g., up to 30 operators at a time), either by direct user input or by an algorithm that automatically infers the user's intent. The display system then reduces the complexity of the data flow representation so that the objectives are satisfied.

An embodiment of the invention includes a method for computing graphs for viewing the topology of a data flow application. The data flow graph is made easier to understand and/or faster to render via a graph visualization tool. The method uses a combination of properties of the data flow application, user preferences, system properties, and performance data cached from a previous rendering of the data flow to suggest appropriate layout configurations, given, for example, the task at hand (e.g., detailed view versus overview) and constraints (e.g., response time, screen size, etc.). A performance profiler captures metrics on elapsed time for computing and displaying transformed graphs, and produces "performance profiles" used by a layout strategy engine to produce time estimates.

At least one embodiment of the invention includes a "layout strategy engine" that generates strategies for visual presentations of data flow application graphs. The visualization is provided by a tool that depicts the data flow application as a graph. The operators are represented by nodes, and the data flow is shown as edges that connect the operators. The strategies generated by the layout strategy engine balance the objectives of showing a meaningful level of detail with efficiently rendering the graph. The layout strategy engine generates the strategies by evaluating a set of graph transformation methods. Those methods (also referred to herein as "layout strategies") that produce the best results with respect to providing a meaningful level of detail, while using the fewest number of graph nodes and edges are proposed to the user. The meaningful level of detail is defined by a combination of user preferences (e.g., do not show more than 2 levels of nested operations), rules (e.g., graph nodes must be separated by at least 5 pixels, the thickness of an edge must be at least 10 pixels less than the height of a node estimated time for computing and displaying the transformed data flow graph), and system properties (e.g., dimensions of viewable area). The evaluation performed by the layout strategy engine includes estimating the time required to transform and display the graph. The layout strategy engine uses the performance profiles captured by the performance profiler to inform the generation of these times estimates. The graph transformation methods consist of various transformations that expand, collapse, and filter repeating patterns in the graph, thereby modifying the size of the graph rendered by the visualization tool.

An embodiment of the invention includes a method for generating a graphical representation of a data flow application, wherein user preferences and performance profiles from previous renderings of graphs are pre-defined or learned. Rules and constraints for laying out graphs and system properties are encoded. The data flow graph is transformed by methods including, but not limited to, collapsing, expanding and filtering repeating patterns in the graph. A collection of graph transformations that in-concert adhere to the user preferences, visualization constraints, and performance constraints are selected. The data flow application graph is displayed using a visualization tool.

The displayed data flow application graph avoids rendering details of the graph that are practically not observable by the user and which consume system resources and time to layout. The need for custom configuration by the user is also reduced. The layout configuration adapts to changes in the data flow application topology. A collection of transformations to the graph is produced that could not be practically configured manually.

FIG. 1 is a flow diagram illustrating a method of displaying a data flow according to an embodiment of the invention. A description of a data flow application to be displayed is received 110, wherein the data flow application includes nodes and edges connecting the nodes. The nodes represent operators and the edges represent data connections for data flowing between the operators. In at least one embodiment of the invention, the description of the data flow application is received by a compiler from a database.

A processor (also referred to herein as a "layout strategy engine") determines (identifies) the reason that a user is to view the data flow and/or a user constraint on a complexity of the data flow application to be displayed 120. In at least one embodiment, the user constraints include the maximum/minimum number of nodes to display, the maximum/minimum number of edges to display, and/or the maximum/minimum level of nested nodes to display. In another embodiment, the user constraints include the maximum/minimum distance between nodes, a maximum/minimum size dimension of a viewable area of the transformed representation (e.g., width, height of graph), and/or the maximum/minimum time to create the transformed representation. In at least one embodiment, the user reason is determined from manual input of the reason by the user.

The processor creates a transformed representation of the data flow application based on the user reason and/or the user constraint 130. The transformed representation provides a simplification of the complexity of the data flow application. More specifically, in at least one embodiment, the processor progressively reduces the complexity of the data flow application to be displayed until objectives are satisfied, wherein the objectives are based upon the user reason and/or the user constraint. The creation of the transformed representation of the data flow application, includes, but is not limited to collecting individual operators into composite operators, pattern extraction, feedback simplification, and/or filtering based on topological properties and data flow. In at least one embodiment of the invention, the creation of the transformed representation of the data flow application is further based on a set of rules that map the user reason and/or the user constraint to suitable transformations of the data flow application.

In another embodiment of the invention, the processor estimates the time required to render a display of the data flow application prior to the creation of the transformed representation of the data flow application. Thus, the creation of the transformed representation of the data flow application is further based upon the estimated time of rendering. For example, if the estimated time required to render a display of the data flow application (e.g., display includes over 500 nodes) is above a threshold, then a transformed representation of the data flow application (e.g., transformed representation includes less than 150 nodes) will be created that takes less time to render.

The transformed representation is displayed to the user (e.g., on a graphical user interface) 140. The transformed representation of the data flow application is written in a language that includes information about abstractions that are used to simplify the representation of the data flow application.

In at least one embodiment of the invention, the transformed representation of the data flow application is created based on, but not restricted to, one or more layout strategies of replacing, modifying, and/or collapsing a subgraph in the data flow application, and/or by replacing, modifying, and/or collapsing nodes within a subgraph with a layout strategy engine. As described more fully below, the layout strategies include, but are not restricted to, collapsing repeating subgraphs, co-presenting features of individual subgraphs, collapsing using logical partitioning of an application, collapsing a graph fanout, collapsing composite operators, collapsing a linear sequence, collapsing loopback connections, semantic zoom using the strategy of collapsing composite operators, and/or semantic zoom using the strategy of collapsing repeating subgraphs.

Figure 2:
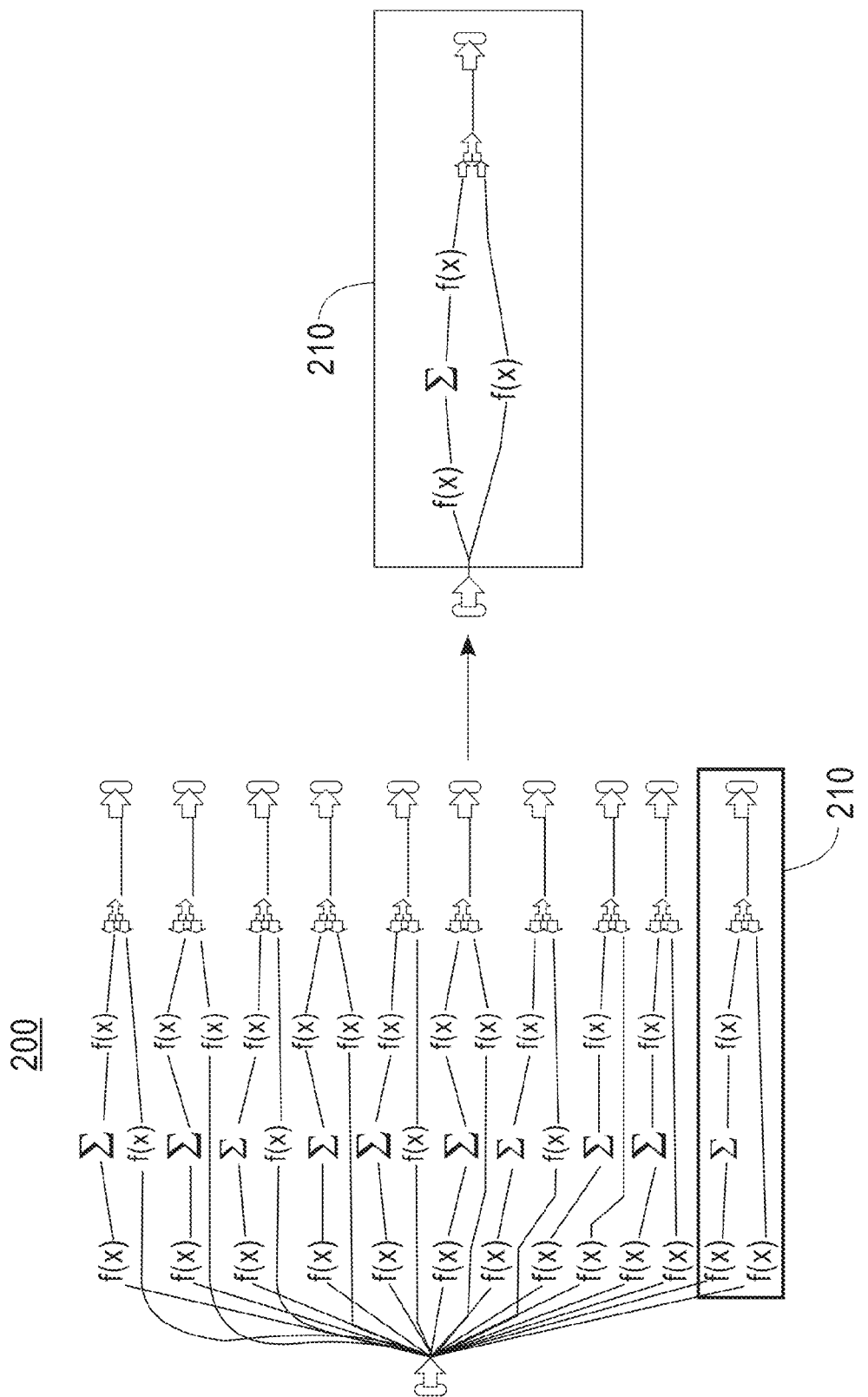
FIG. 2 illustrates a layout strategy for collapsing repeating subgraphs according to an embodiment of the invention.

FIG. 2 illustrates a layout strategy for collapsing repeating subgraphs according to an embodiment of the invention. A transformed representation of the data flow application 200 includes a plurality of subgraphs. A magnified view of the bottom subgraph 210 of the data flow application 200 indicates that the nodes and edges of the subgraph 210 are repeated 10 times in the data flow application 200. Thus, this layout strategy replaces repeating (identical) subgraphs with a single subgraph of the repeating subgraphs and an indicator indicating the number of repeating subgraphs.

Figure 3:
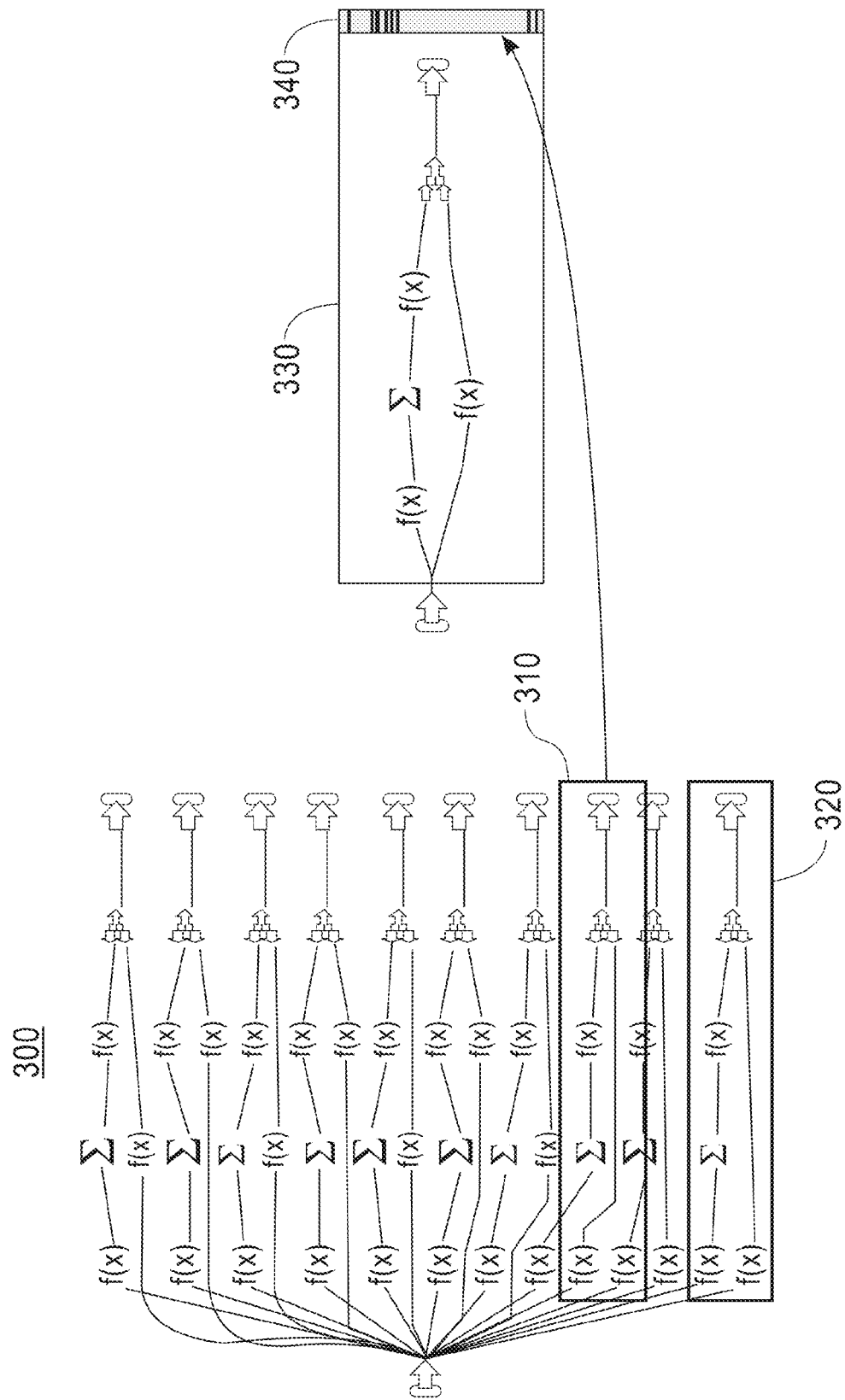
FIG. 3 illustrates a layout strategy for co-presenting features of individual subgraphs according to an embodiment of the invention.

FIG. 3 illustrates a layout strategy for co-presenting features of individual subgraphs according to an embodiment of the invention. A data flow application 300 includes a first subgraph 310 and a second subgraph 320, wherein the first subgraph 310 and the second subgraph 320 share common nodes and edges (e.g., have identical topologies). In the transformed representation, the first subgraph 310 and the second subgraph 320 are replaced with a combination subgraph 330, wherein the combination subgraph 330 includes a single subgraph of the repeating subgraphs. In a least one embodiment, the combination subgraph 330 includes an indicator indicating the number of repeating subgraphs (e.g., "×10") and an indicator that co-presents a property 340 (e.g., throughput rate, CPU utilization, the number of dropped messages) from each of the individual subgraphs.

Figure 4:
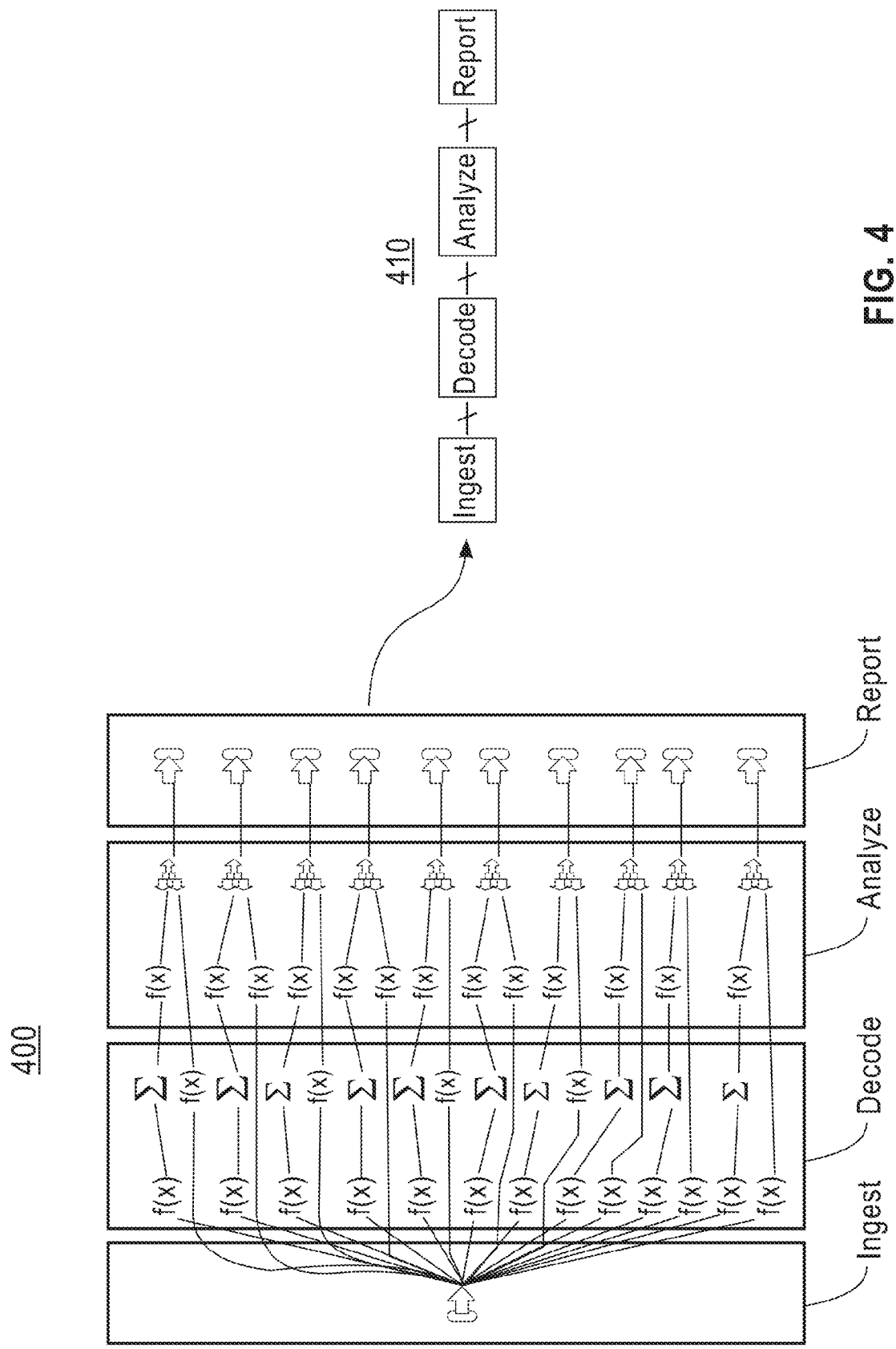
FIG. 4 illustrates a layout strategy for collapsing using logical partitioning of an application according to an embodiment of the invention.

FIG. 4 illustrates a layout strategy for collapsing using logical partitioning of an application according to an embodiment of the invention. A data flow application 400 includes subgraphs that have logical portions in common (also referred to herein as the third subgraph and the at least one fourth subgraph). In the example illustrated in FIG. 4, all of the subgraphs share the logical portions: ingest, decode, analyze, and report. In at least one embodiment, the logical portions that are shared by the subgraphs are identified by the user. Thus, the data flow application includes a single third subgraph and nine fourth subparagraphs. In the transformed representation, the subgraphs that share logical portions are replaced with a logical subgraph 410, wherein the logical subgraph 410 includes logical icons/representations of the shared logical portions.

Figure 5:
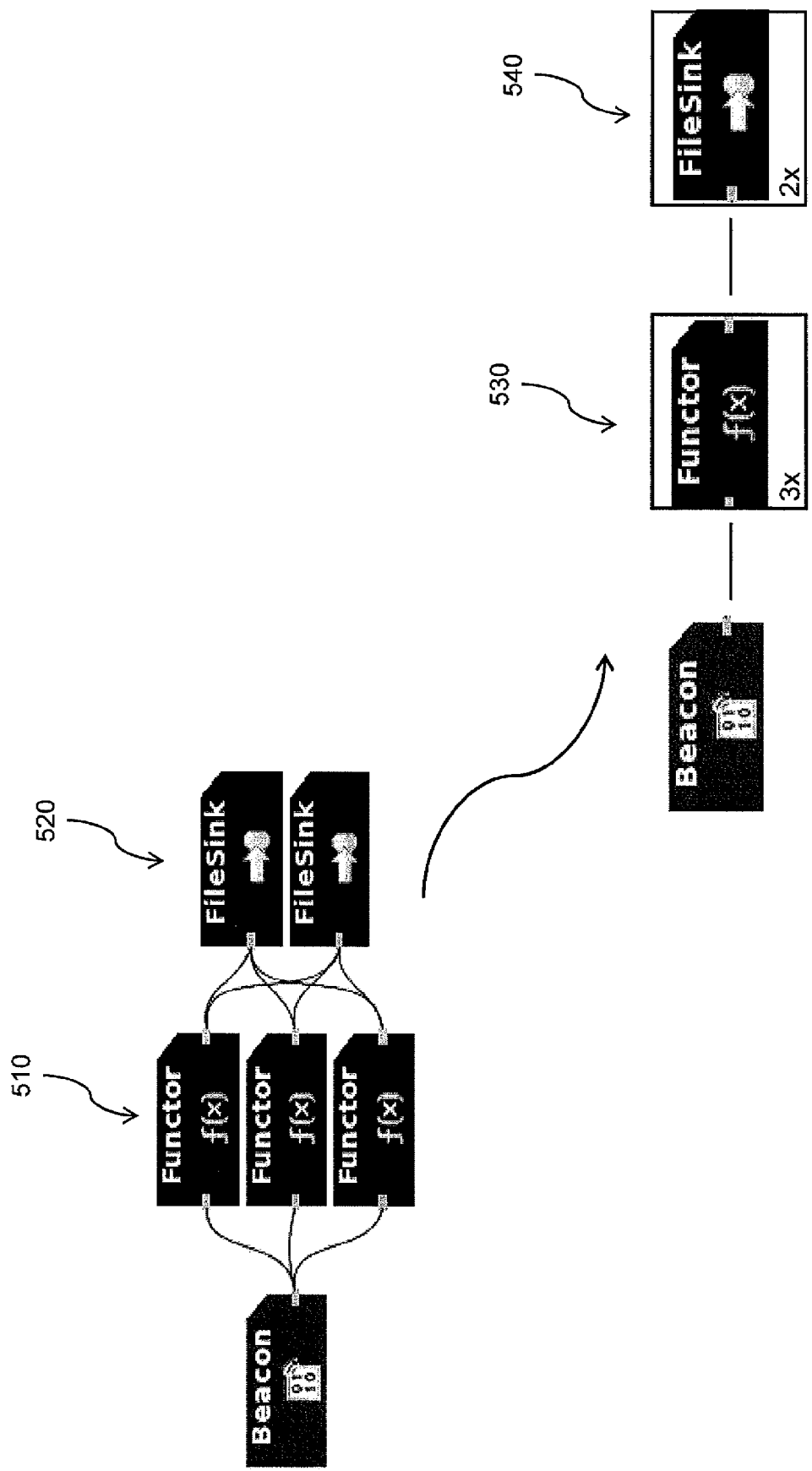
FIG. 5 illustrates a layout strategy for collapsing a graph fanout according to an embodiment of the invention.

FIG. 5 illustrates a layout strategy for collapsing a graph fanout according to an embodiment of the invention. A data flow application includes a subgraph 500 that includes repeating (identical) nodes 510 and 520. In the transformed representation, the repeating nodes are collapsed into nodes 530 and 540. The collapsed nodes 530 and 540 include indicators to indicate the number of repeating nodes in the subgraph.

Figure 6:
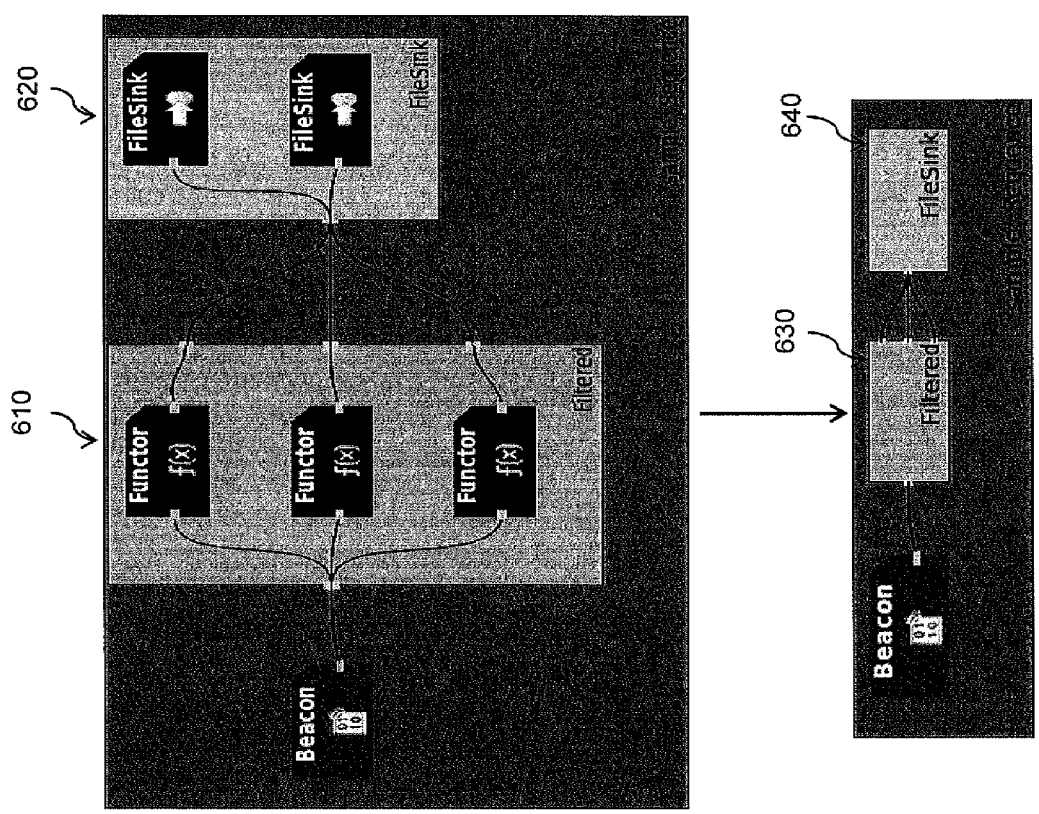
FIG. 6 illustrates a layout strategy for collapsing composite operators according to an embodiment of the invention.

FIG. 6 illustrates a layout strategy for collapsing composite operators according to an embodiment of the invention. A data flow application includes a subgraph that includes at least one set of nodes that share a common operation. For example, a subgraph 600 includes a set of nodes 610 that share a Filtered operation, and a set of nodes 620 that share a FileSink operation. In the transformed representation, the nodes that share a common operation are replaced with a composite operator. Thus, for example, the set of nodes 610 are replaced with a Filtered composite operator 630; and, the set of nodes 620 are replaced with a FileSink composite operator 640. For example, The IBM Streams Processing Language Specification for IBM Infosphere Streams Version 2.0.0.3 describes a programming model the supports composite operators.

Figure 7:
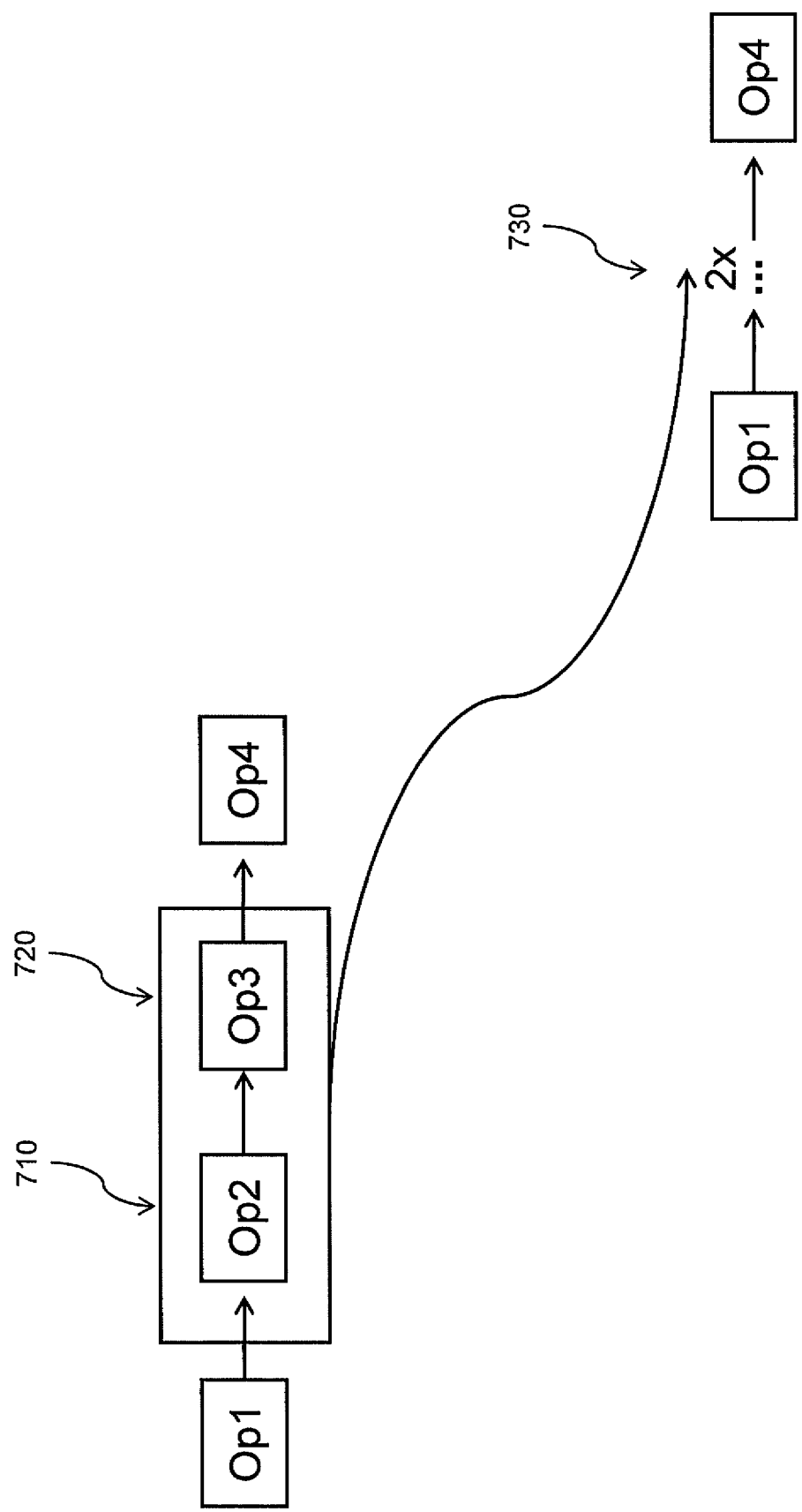
FIG. 7 illustrates a layout strategy for collapsing a linear sequence according to an embodiment of the invention.

FIG. 7 illustrates a layout strategy for collapsing a linear sequence according to an embodiment of the invention. A data flow application includes a subgraph that includes at least two consecutive nodes in a linear sequence. In the transformed representation, the consecutive nodes are replaced with an icon indicating the number of replaced consecutive nodes. Thus, for example, FIG. 7 illustrates nodes 710 and 720 that are replaced with an icon 730 indicating that two consecutive nodes have been replaced. In another embodiment, the Op1 node and/or Op4 node are also be collapsed.

Figure 8:
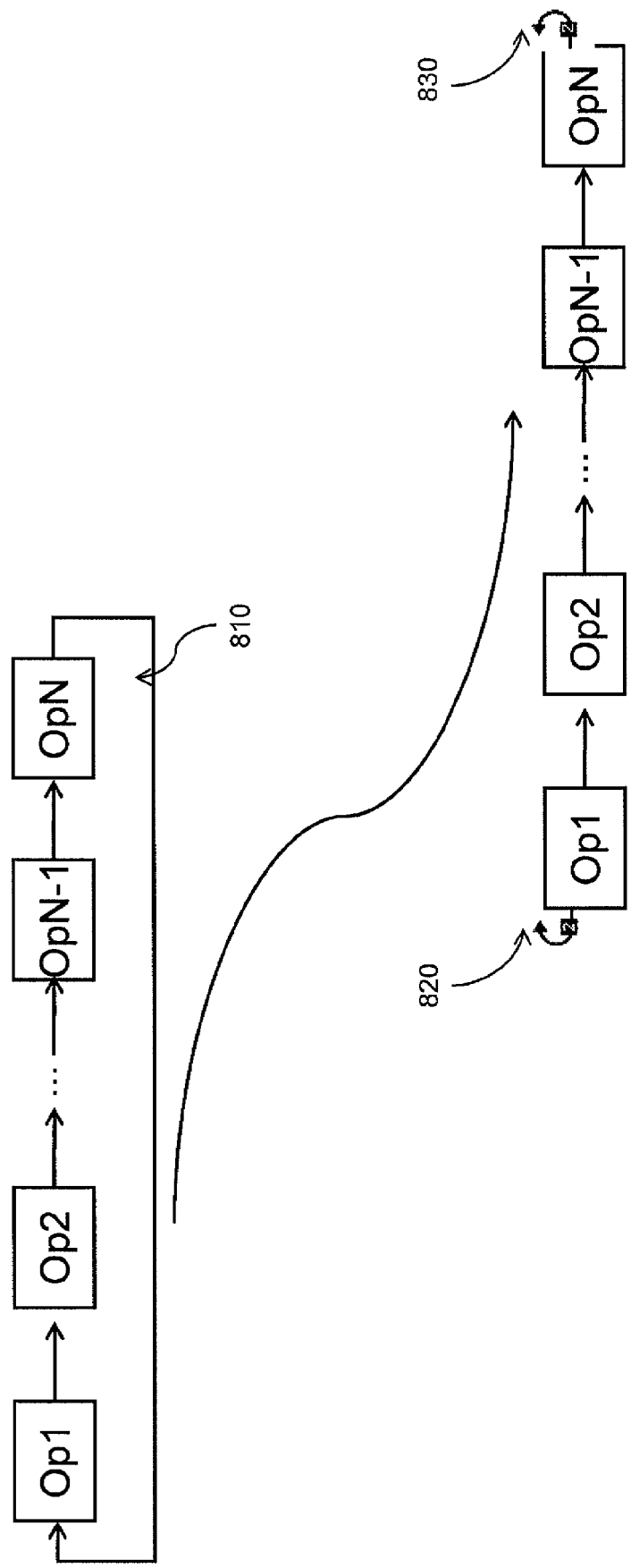
FIG. 8 illustrates a layout strategy for collapsing loopback connections according to an embodiment of the invention.

FIG. 8 illustrates a layout strategy for collapsing loopback connections according to an embodiment of the invention. A data flow application includes a subgraph that includes a looping edge 810. In the transformed representation, the looping edge 810 is replaced with an icons 820 and 830 that represent the first and last nodes in the loop, respectively.

Figure 9A:
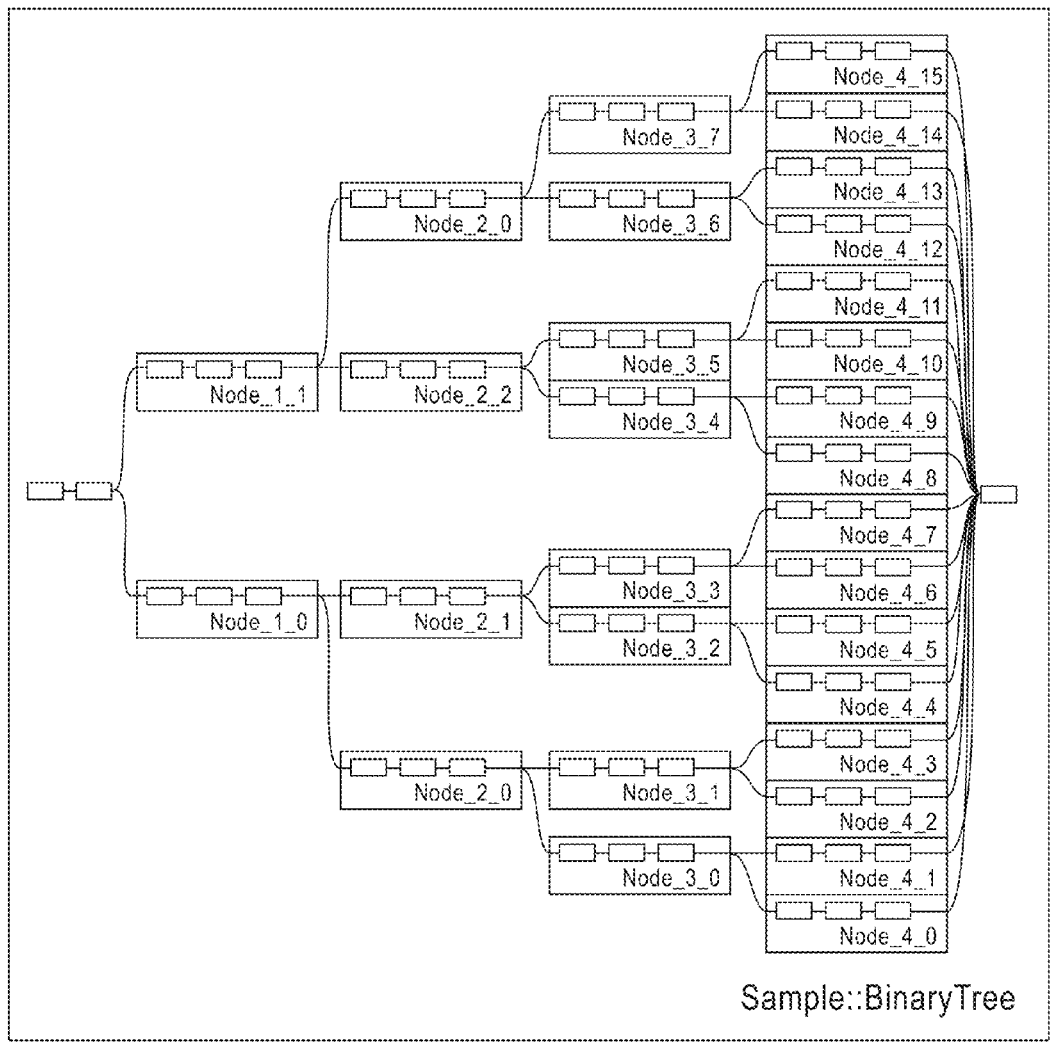
FIGS. 9A, 9B, 9C, and 9D illustrate a layout strategy for semantic zoom using strategy of collapsing composite operators according to an embodiment of the invention.
Figure 9B:
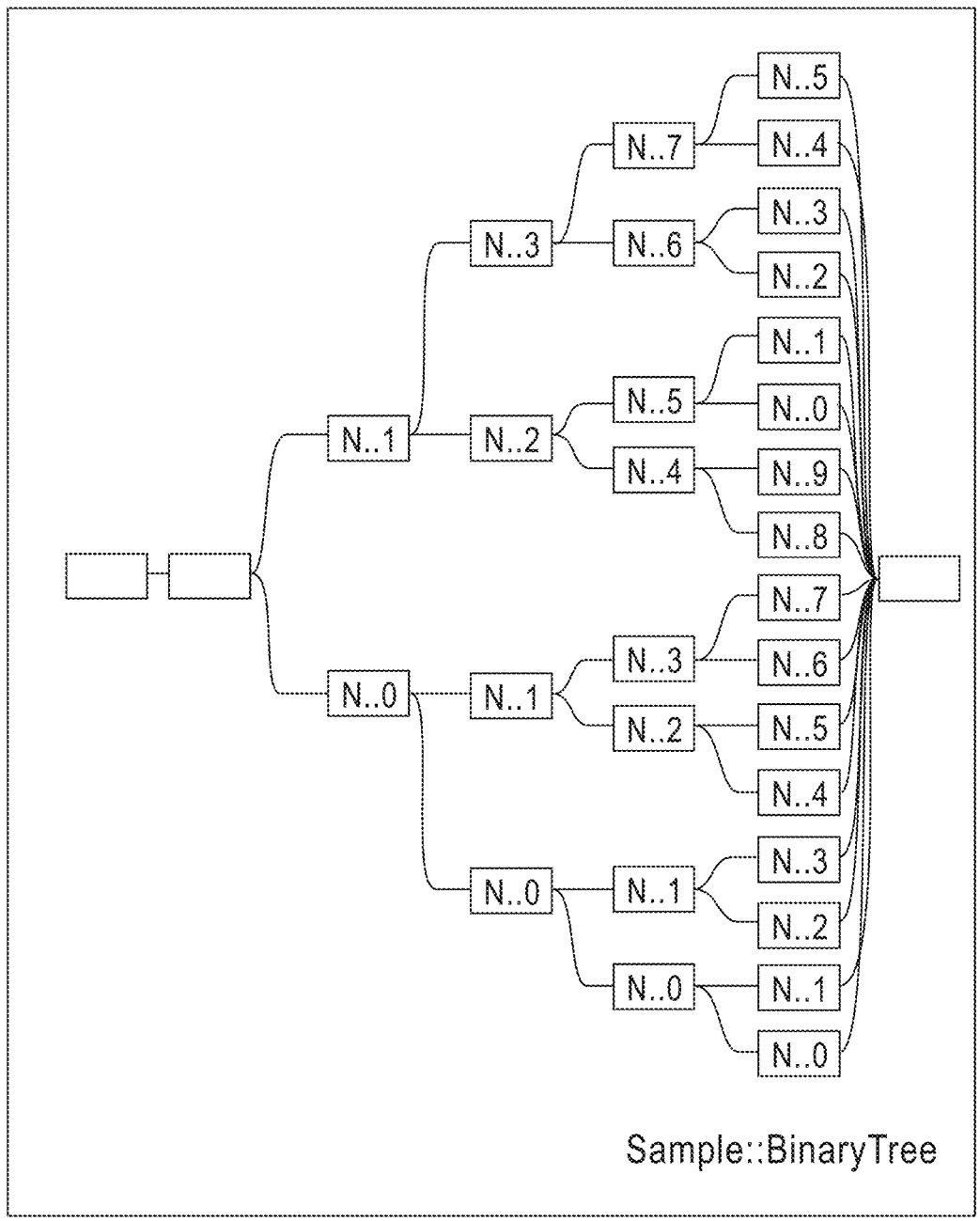
Figure 9C:
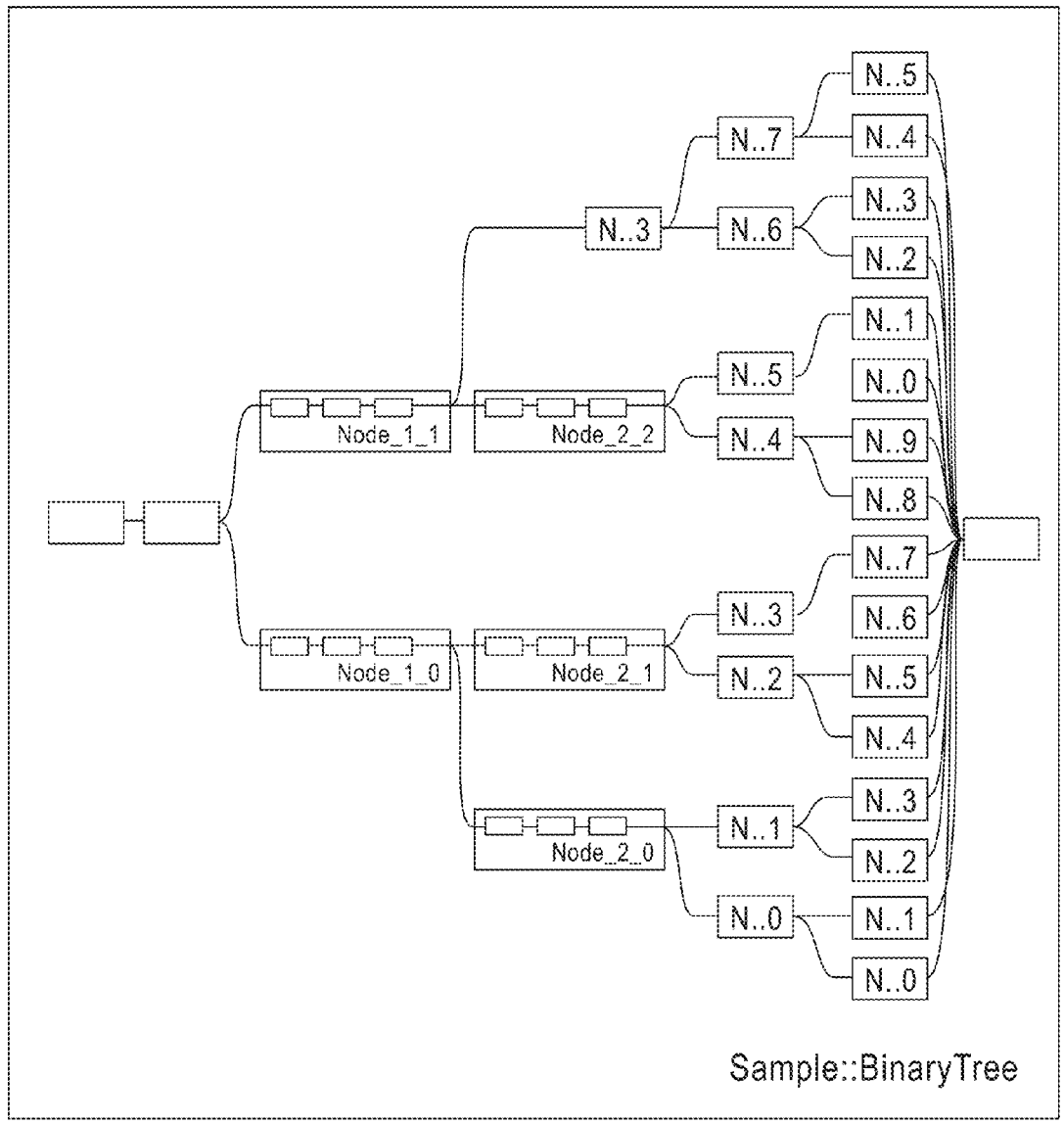
Figure 9D:
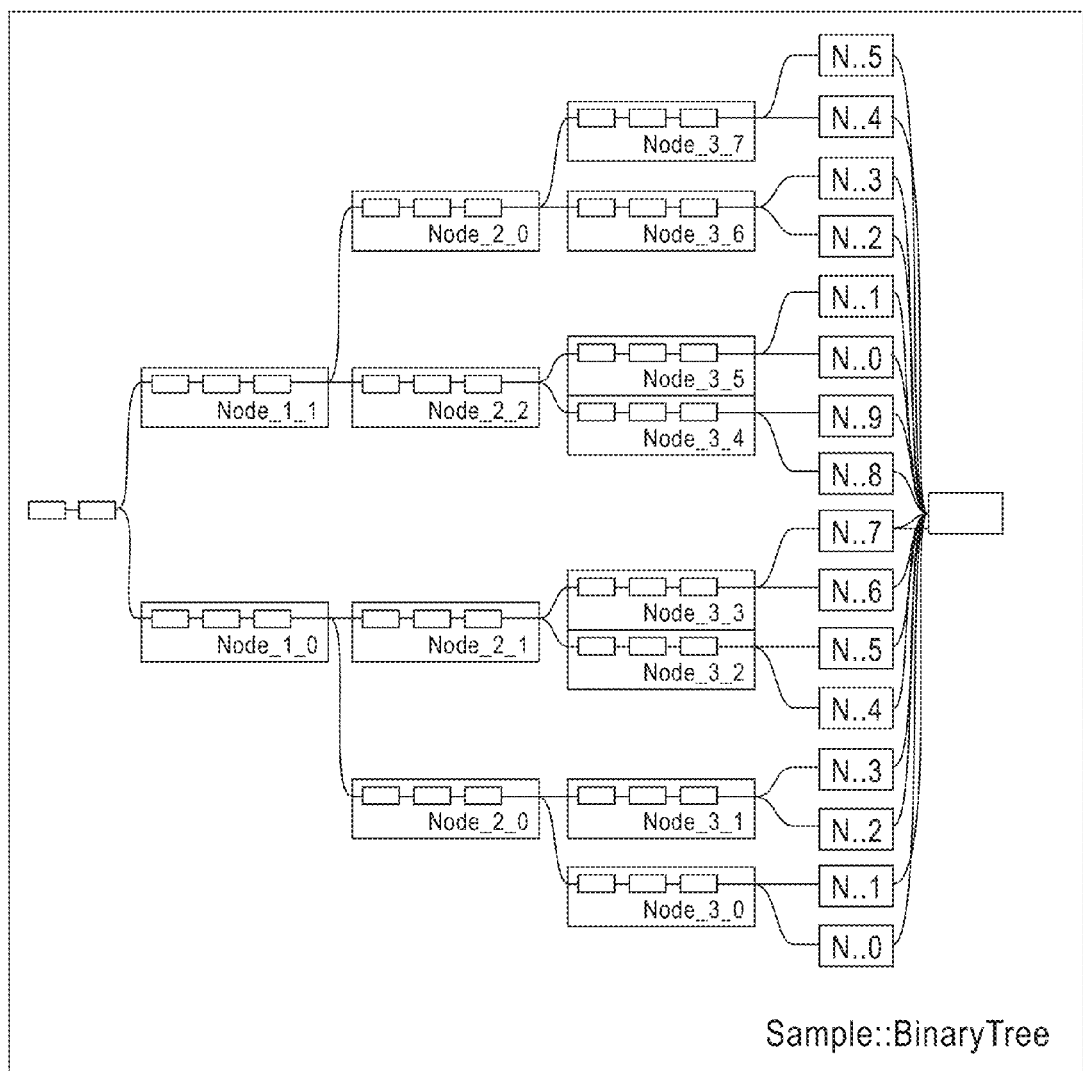

FIGS. 9A, 9B, 9C, and 9D illustrate a layout strategy for semantic zoom using the strategy of collapsing composite operators according to an embodiment of the invention. This layout strategy collapses all of the composite operator nodes (thereby hiding the composite operator's subgraph) in a graph and then expands the composite operator nodes (exposing the composite operator's subgraph) until a threshold number of nodes (e.g., user or system administrator defined) for the subgraph is reached. In at least one embodiment, the composite operator nodes are expanded starting from the source node (on the far left of the graph). FIG. 9A illustrates an exemplary subgraph having a total of 123 nodes, which is below the maximum threshold of 125 nodes. FIGS. 9B, 9C, and 9D illustrate exemplary subgraphs having maximum node thresholds of 35, 50, and 85 nodes, respectively.

Figure 10:
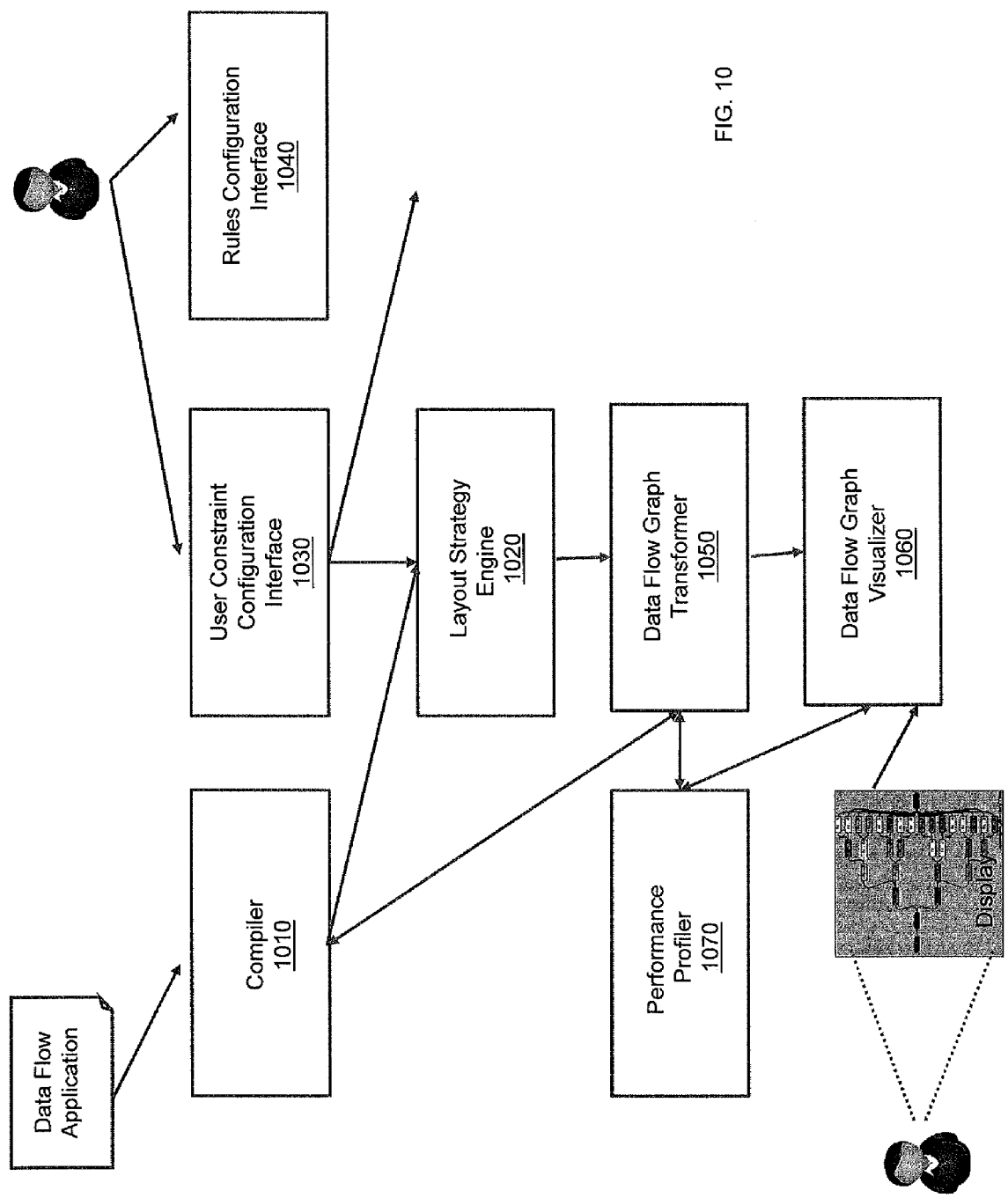
FIG. 10 illustrates a system for displaying a data flow according to an embodiment of the invention.

FIG. 10 illustrates a system for displaying a data flow according to an embodiment of the invention. A compiler 1010 produces an abstract representation of a data flow application. The compiler 1010 is connected to a layout strategy engine 1020, which estimates the time required to transform and render a graph (e.g., with a performance profiler). As used herein, the term "connected" includes operationally connected, logically connected, in communication with, physically connected, engaged, coupled, contacts, linked, affixed, and attached. The layout strategy engine 1020 also selects a graph transformation method based on the user reasons, estimated time, user constraints (e.g., manually entered by the user via a user constraint configuration interface 1030), and/or rules (e.g., manually entered by the user via a rules configuration interface 1040), or learned from the prior selection and execution of layout strategies.

The layout strategy engine 1020 is further connected to the user constraint configuration interface 1030, the rules configuration interface 1040, and a data flow graph transformer 1050. In another embodiment, a database is between the layout strategy engine 1020 and the user constraint configuration interface 1030 and/or rules configuration interface 1040. The data flow graph transformer 1050 uses the strategy produced by the layout strategy engine 1020 to transform the input abstract representation of a data flow application to an output abstract representation.

The data flow graph transformer 1050 is connected to a data flow graph visualizer 1060 (e.g., a driver) and a performance profiler 1070. The data flow graph visualizer 1060 renders a visualization of the graph specified by the transformed abstract representation. The performance profiler 1070 captures metrics on elapsed time for computing and displaying transformed graphs, and produces "performance profiles" used by the layout strategy engine 1020 to produce time estimates.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
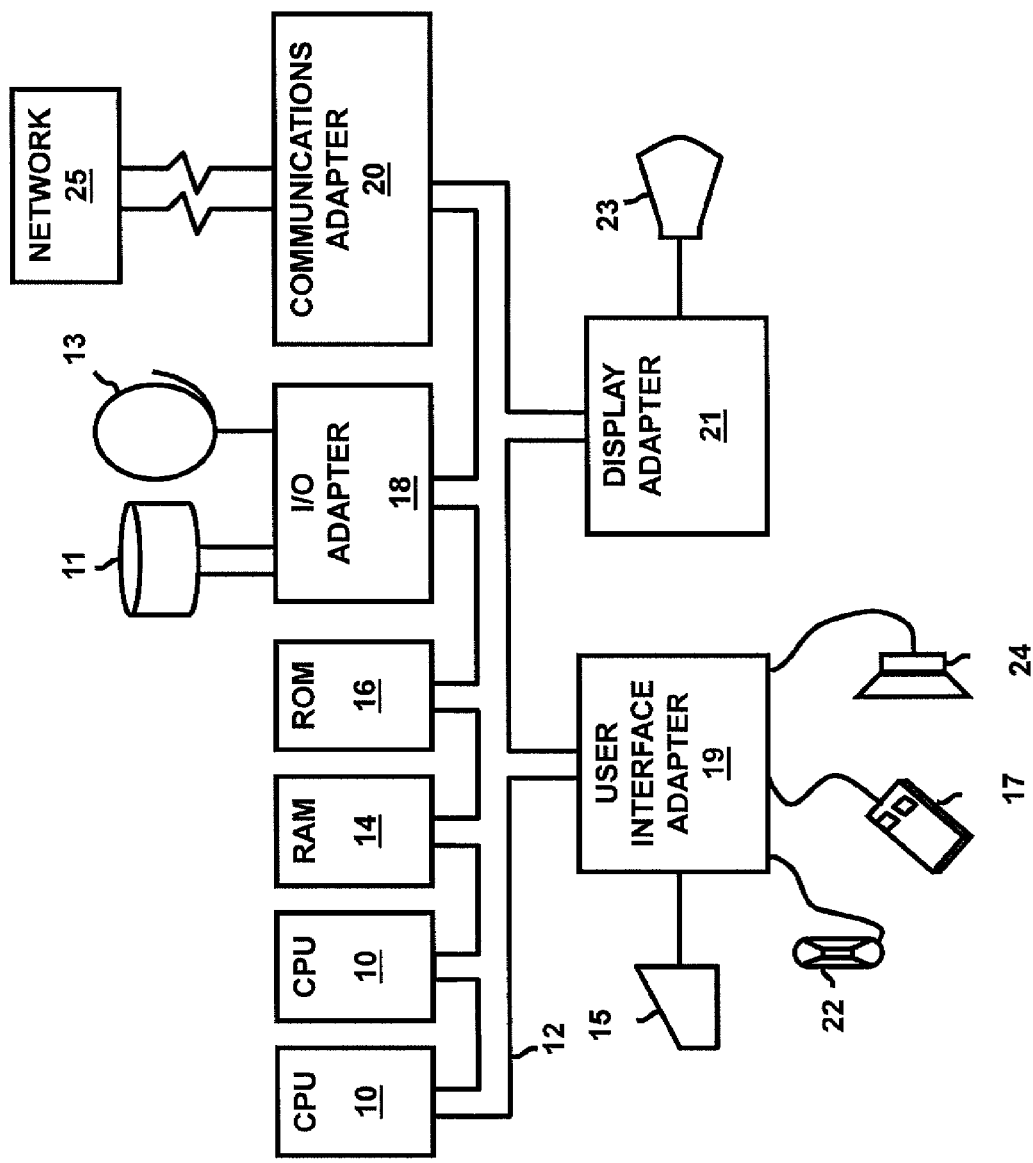
FIG. 11 illustrates a computer program product according to an embodiment of the invention.

Referring now to FIG. 11, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, executed by a processor, of displaying a data flow, said method comprising:
   receiving a description of a data flow application to be displayed, the data flow application including nodes and edges connecting the nodes, the nodes representing operators and the edges representing data connections for data flowing between the operators;
   determining at least one of a reason that a user is to view the data flow application and a user constraint on a complexity of the data flow application to be displayed with the processor;
   creating a transformed representation of the data flow application based upon at least one of the user reason and the user constraint, wherein said creating of the transformed representation of the data flow application is further based on a set of rules that map at least one of the user reason and the user constraint to suitable transformations of the data flow application, and wherein said creating of the transformed representation of the data flow application progressively reduces the complexity of the data flow application to be displayed until objectives are satisfied, wherein the objectives are based upon at least one of the user reason and the user constraint; and
   displaying the transformed representation.

2. The method according to claim 1, wherein said method further comprises, prior to said creating of the transformed representation of the data flow application, estimating a time required to render a display of the data flow application, and
   wherein said creating of the transformed representation of the data flow application is further based upon the estimated time of rendering.

3. The method according to claim 1, wherein said creating of the transformed representation of the data flow application is at least one of:
   performing composite operators,
   performing pattern extraction,
   performing feedback simplification, and
   performing filtering based on topological properties and data flow.

4. The method according to claim 1, wherein the transformed representation of the data flow application is written in a language that includes information about abstractions that are used to simplify the representation of the data flow application.

5. The method according to claim 1, wherein the user constraints comprise at least one of:
   a maximum number of nodes to display,
   a minimum number of nodes to display,
   a maximum number of edges to display,
   a minimum number of edges to display,
   a maximum distance between nodes,
   a minimum distance between nodes,
   a maximum level of nested nodes to display,
   a minimum level of nested nodes to display,
   at least one maximum size dimension of a viewable area of the transformed representation,
   at least one minimum size dimension of the viewable area of the transformed representation,
   a maximum time to create the transformed representation, and
   a minimum time to create the transformed representation.

6. The method according to claim 1, wherein said creating of the transformed representation of the data flow application is further based upon a layout strategy, wherein the layout strategy includes at least one of:
   replacing repeating subgraphs with a single subgraph of the repeating subgraphs and an indicator indicating the number of repeating subgraphs;
   replacing a first subgraph and at least one second subgraph with a combination subgraph, the combination subgraph including components from the first subgraph that are in common with the at least one second subgraph, wherein the first subgraph is different from the at least one second subgraph;
   replacing a third subgraph and at least one fourth subgraph with a logical subgraph, the logical subgraph including logical representations of portions in common between the third subgraph and the at least one fourth subgraph, wherein the third subgraph is different from the at least one fourth subgraph;
   collapsing repeating nodes within a single subgraph and indicating the number of repeating nodes in the single subgraph;
   replacing at least one set of nodes within a single subgraph with a composite operator, wherein the replaced set of nodes share a common operation;
   replacing at least two consecutive nodes within a single subgraph with an icon indicating the number of replaced consecutive nodes;
   replacing a looping edge with a first icon indicating a first node in the loop and a second icon indicating a second node in the loop; and
   collapsing all composite nodes in a subgraph and expanding the composite nodes until a threshold number of nodes for the subgraph is reached.

7. A method, executed by a processor, of displaying a data flow, said method comprising:
   receiving a description of a data flow application to be displayed, the data flow application including nodes and edges connecting the nodes, the nodes representing operators and the edges representing data connections for data flowing between the operators;
   determining at least one of a reason that a user is to view the data flow application and a user constraint on a complexity of the data flow application to be displayed with the processor;
   estimating a time required to render a display of the data flow application;
   creating a transformed representation of the data flow application with the processor, the transformed representation being created based upon at least one of the user reason, the user constraint, and the estimated time of rendering, the transformed representation providing a simplification of the complexity of the data flow application; and displaying the transformed representation on a graphical user interface,
wherein said creating of the transformed representation of the data flow application is further based upon a layout strategy, wherein the layout strategy includes:
replacing repeating subgraphs with a single subgraph of the repeating subgraphs and an indicator indicating the number of repeating subgraphs;
collapsing repeating nodes within a single subgraph and indicating the number of repeating nodes in the single subgraph;
replacing at least one set of nodes within a single subgraph with a composite operator, wherein the replaced set of nodes share a common operation;
replacing at least two consecutive nodes within a single subgraph with an icon indicating the number of replaced consecutive nodes; and
replacing a looping edge with an icon in a first node of the loop, the icon indicating that the node is the first node in the loop.

8. The method according to claim 7, wherein said creating of the transformed representation of the data flow application is at least one of:
performing composite operations,
performing pattern extraction,
performing feedback simplification, and
performing filtering based on topological properties and data flow.

9. The method according to claim 7, wherein said creating of the transformed representation of the data flow application is further based on a set of rules that map at least one of the user reason and the user constraint to suitable transformations of the data flow application.

10. The method according to claim 7, wherein said creating of the transformed representation of the data flow application progressively reduces the complexity of the data flow application to be displayed until objectives are satisfied, wherein the objectives are based upon at least one of the user reason and the user constraint.

11. The method according to claim 7, wherein the transformed representation of the data flow application is written in a language that includes information about abstractions that are used to simplify the representation of the data flow application.

12. The method according to claim 7, wherein the user constraints comprise:
a maximum number of nodes to display,
a minimum number of nodes to display,
a maximum number of edges to display,
a minimum number of edges to display,
a maximum distance between nodes,
a minimum distance between nodes,
a maximum level of nested nodes to display,
a minimum level of nested nodes to display,
at least one maximum size dimension of a viewable area of the transformed representation, and
at least one minimum size dimension of the viewable area of the transformed representation.

13. The method according to claim 7, wherein said creating of the transformed representation of the data flow application is further based upon a layout strategy, wherein the layout strategy includes:
replacing a first subgraph and at least one second subgraph with a combination subgraph, the combination subgraph including components from the first subgraph that are in common with the at least one second subgraph, wherein the first subgraph is different from the at least one second subgraph; and
replacing a third subgraph and at least one fourth subgraph with a logical subgraph, the logical subgraph including logical representations of portions in common between the third subgraph and the at least one fourth subgraph, wherein the third subgraph is different from the at least one fourth subgraph;
collapsing all composite nodes in a subgraph and expanding the composite nodes until a threshold number of nodes for the subgraph is reached.

14. A method, executed by a processor, of displaying a data flow, said method comprising:
receiving a description of a data flow application to be displayed, the data flow application including nodes and edges connecting the nodes, the nodes representing operations and the edges representing data connections for data flowing between the operators;
determining at least one of a reason that a user is to view the data flow and a user constraint on a complexity of the data flow application to be displayed;
creating a transformed representation of the data flow application based upon at least one of the user reason, the user constraint, and a layout strategy, wherein the layout strategy includes at least one of:
replacing a first subgraph and at least one second subgraph with a combination subgraph, the combination subgraph including components from the first subgraph that are in common with the at least one second subgraph, wherein the first subgraph is different from the at least one second subgraph; and
replacing a third subgraph and at least one fourth subgraph with a logical subgraph, the logical subgraph including logical representations of portions in common between the third subgraph and the at least one fourth subgraph, wherein the third subgraph is different from the at least one fourth subgraph;
collapsing all composite nodes in a subgraph and expanding the composite nodes until a threshold number of nodes for the subgraph is reached, wherein said creating of the transformed representation of the data flow application is further based on a set of rules that map at least one of the user reason and the user constraint to suitable transformations of the data flow application, and wherein said creating of the transformed representation of the data flow application progressively reduces the complexity of the data flow application to be displayed until objectives are satisfied, wherein the objectives are based upon at least one of the user reason and the user constraint; and
displaying the transformed representation.

15. The method according to claim 14, wherein said method further comprises, prior to said creating of the transformed representation of the data flow application, estimating a time required to render a display of the data flow application, and
wherein said creating of the transformed representation of the data flow application is further based upon the estimated time of rendering.

16. The method according to claim 14, wherein said creating of the transformed representation of the data flow application is at least one of:
performing composite operations,
performing pattern extraction,
performing feedback simplification, and performing filtering based on topological properties and data flow.

17. The method according to claim 14, wherein the transformed representation of the data flow application is written in a language that includes information about abstractions that are used to simplify the representation of the data flow application.

18. The method according to claim 14, wherein the user constraints comprise at least one of:
- a maximum number of nodes to display,
- a minimum number of nodes to display,
- a maximum number of edges to display,
- a minimum number of edges to display,
- a maximum distance between nodes,
- a minimum distance between nodes,
- a maximum level of nested nodes to display,
- a minimum level of nested nodes to display,
- at least one maximum size dimension of a viewable area of the transformed representation,
- at least one minimum size dimension of the viewable area of the transformed representation,
- a maximum time to create the transformed representation, and
- a minimum time to create the transformed representation.

19. The method according to claim 14, wherein the layout strategy includes at least one of:
- replacing repeating subgraphs with a single subgraph of the repeating subgraphs and an indicator indicating the number of repeating subgraphs;
- collapsing repeating nodes within a single subgraph and indicating the number of repeating nodes in the single subgraph;
- replacing at least one set of nodes within a single subgraph with a composite operator, wherein the replaced set of nodes share a common operation;
- replacing at least two consecutive nodes within a single subgraph with an icon indicating the number of replaced consecutive nodes; and
- replacing a looping edge with an icon in a first node of the loop, the icon indicating that the node is the first node in the loop.

20. A computer program product for displaying a data flow, said computer program product comprising:
- a non-transitory computer readable storage medium;
- first program instructions to receive a description of a data flow application to be displayed, the data flow application including nodes and edges connecting the nodes, the nodes representing operations and the edges representing data connections for data flowing between the operations;
- second program instructions to determine at least one of a reason that a user is to view the data flow and a user constraint on a complexity of the data flow application to be displayed;
- third program instructions to create a transformed representation of the data flow application based upon at least one of the user reason and the user constraint, wherein said creating of the transformed representation of the data flow application is further based on a set of rules that map at least one of the user reason and the user constraint to suitable transformations of the data flow application, and wherein said creating of the transformed representation of the data flow application progressively reduces the complexity of the data flow application to be displayed until objectives are satisfied, wherein the objectives are based upon at least one of the user reason and the user constraint; and
- fourth program instructions to display the transformed representation,
- wherein said first program instructions, said second program instructions, said third program instructions, and said fourth program instructions are stored on said computer readable storage medium.

* * * * *